United States Patent [19]
Brix et al.

[11] Patent Number: 6,087,284
[45] Date of Patent: Jul. 11, 2000

[54] ALUMINOSILICATE GLASS FOR FLAT DISPLAY DEVICES

[75] Inventors: Peter Brix; Wilfried Linz, both of Mainz, Germany

[73] Assignee: Schott Glas, Mainz, Germany

[21] Appl. No.: 09/084,252

[22] Filed: May 26, 1998

[30] Foreign Application Priority Data

May 24, 1997 [DE] Germany .......................... 197 21 738

[51] Int. Cl.$^7$ .......................... C03C 3/085; C03C 3/087; C03C 3/095; C03C 3/097; C03C 4/00
[52] U.S. Cl. ............................... 501/69; 501/63; 501/64; 501/70; 501/72
[58] Field of Search .................. 501/63, 64, 69, 501/70, 72

[56] References Cited

U.S. PATENT DOCUMENTS

| | | | |
|---|---|---|---|
| 4,367,367 | 1/1983 | Reisfeld | 501/71 |
| 4,390,637 | 6/1983 | Daiku | 501/64 |
| 4,521,524 | 6/1985 | Yamashita et al. | 501/64 |
| 4,562,161 | 12/1985 | Mennemann et al. | 501/64 |
| 5,434,111 | 7/1995 | Clement et al. | 501/70 |
| 5,599,754 | 2/1997 | Maeda et al. | |
| 5,776,844 | 7/1998 | Koch et al. | |
| 5,780,371 | 7/1998 | Rifqi et al. | |
| 5,854,152 | 12/1998 | Kohli et al. | 501/70 |
| 5,854,153 | 12/1998 | Kohli | 501/70 |
| 5,858,897 | 1/1999 | Maeda et al. | 501/70 |
| 5,900,296 | 5/1999 | Hayashi et al. | 501/70 |

FOREIGN PATENT DOCUMENTS

| | | |
|---|---|---|
| 0 729 922 | 9/1996 | European Pat. Off. . |
| 4303474 | 10/1993 | Germany . |
| 3-40933 | 2/1991 | Japan . |
| 4309701 | 6/1994 | Japan . |
| 7-257937 | 10/1995 | Japan . |
| 8-290939 | 11/1996 | Japan . |
| 10-25128 | 1/1998 | Japan . |
| 10-25129 | 1/1998 | Japan . |
| 10-25130 | 1/1998 | Japan . |
| WO 96/09259 | 3/1996 | WIPO . |
| WO 96/11887 | 4/1996 | WIPO . |

OTHER PUBLICATIONS

Austrian Search Report No Date.
Derwent Publications, Inc., XP–002076104, AN 95–379869 and JP 07257937, Oct. 1995.
Patent Abstracts of Japan, Publication No. 3–40933 Feb. 1991.
Patent Abstracts of Japan, Publication No. 10–25129 Jan. 1998.
Patent Abstracts of Japan, Publication No. 10–25130 Jan. 1998.
Patent Abstracts of Japan, Publication No. 10–25128 Jan. 1998.

*Primary Examiner*—Michael Marcheschi
*Attorney, Agent, or Firm*—Millen, White, Zelano, & Branigan, P.C.

[57] ABSTRACT

The invention relates to a solarization-stable aluminosilicate glass which has the following composition (in % by weight, based on oxide): $SiO_2$ 45–68; $Al_2O_3$>5–18; $Na_2O$ 0–5; $K_2O$>9–15; where $Na_2O+K_2O \geq 10$; CaO 0–10; SrO 0.5–18; BaO 0–10; where CaO+SrO+BaO 8–<17; $ZrO_2$ 1–6; $TiO_2$ 0.2–5. The glass is particularly suitable as substrate glass in display technology, in particular for plasma display panels.

12 Claims, No Drawings

ALUMINOSILICATE GLASS FOR FLAT DISPLAY DEVICES

The invention relates to an aluminosilicate glass which is suitable for use in display technology.

The requirements of a glass which is to be employed in display technology as substrate glass for flat display devices, specifically as substrate glass for the production of plasma display panels (PDPs), are described, inter alia, by L. F. Weber in "Color Plasma Displays", 1996 SID International Symposium, Seminar Lecture Notes M-6, San Diego, USA, 1996.

In principle, the image-generating elements in the PDP process are a multiplicity of flattened and miniaturized fluorescent tubes: a front plate together with a back plate and the cross-pieces of a channel plate which are perpendicular to one another form hermetically sealed spaces, which are filled with noble gases at low pressure (for example Ne at 500 torr) and in which application of a voltage of between 200 and 300 volts produces a glow discharge with emission of ultra-violet light. By coating the inside of the front plate with suitable fluorescent substances (phosphors), light in the desired colour can be generated. By combining three image points in the primary colours to form a pixel (picture element), a colour display can be achieved analogously to known TV sets operating on the basis of Braun tubes. The grid-like arrangement of the electrode leads in rows, which are located on the inside of the front plate, and columns, which are located on the inside of the rear wall, allows each pixel to be addressed specifically.

As far as the materials are concerned, the same requirements thus apply to the substrate glasses for PDPs as for the tube glasses of fluorescent lamps (neon tubes). In addition to the requisite transparency of the material, it is essential that the expansion behaviour is matched to common fluorescent materials. The thermal expansion $\alpha_{20/300}$ of the glass should therefore be in the region of conventional window glasses, i.e. from about 8.1 to $9.0 \times 10^{-6}$/K.

In contrast to glasses for conventional neon tubes, PDP glasses must be capable of manufacture in the form of large-format glass sheets. A common and preferred process for the production of glass sheets is the float process, in which the glass melt is poured onto a metal bath and is pulled off in the form of a broad sheet with cooling to about the glass transition temperature $T_g$. In order to prevent oxidation of the metal bath, the process is carried out under a reducing protective-gas atmosphere. For this processing method, the glasses must therefore not contain any components, such as lead oxide, arsenic oxide or antimony oxide, which are converted into the metallic form under the reducing conditions of the float process and could consequently colour or cloud the glass. Glasses which can be converted into glass sheets in the outlined manner and do not exhibit this discoloration are referred to here as floatable or processible in a float unit.

In alkali metal-containing melts, boron oxide $B_2O_3$ is also a critical glass component because it can escape from the melt in the form of the alkali metal borates. The actual problem here is not the evaporation, but uncontrolled condensation of the alkali metal borates on the glass sheet and the attendant glass flaws. A further critical glass component is zinc oxide ZnO, which can likewise evaporate from the melt and again exhibit undesired condensation phenomena. In order to avoid surface flaws in the glass, it is therefore desirable for PDP glasses not to contain any $B_2O_3$ or ZnO either.

Owing to the complex production of plasma display panels, the glass parts are subject to strict dimensional tolerances, in particular after repeated warming with subsequent cooling to room temperature. This is because the glass parts can, even on temperature treatment below the transition temperature $T_g$, suffer from a certain amount of shrinkage, which, particularly in the case of large-format displays, hinders accurate geometric alignment of the package as a whole. This glass property, also known as compaction, should be as small as possible. Since sufficiently accurate measurement of compaction is only possible with great difficulty, glasses having a high transition temperature $T_g$ are preferred since the compaction in them is, according to experience, less than in glasses having a low $T_g$.

The transition temperature should be above 650° C. Alternatively to the $T_g$, the temperatures in the lower temperature range which are defined via certain viscosities can also be used as criterion for the suitability of the glasses as substrates for plasma display panels; the temperature for viscosity $10^{14.7}$ dPas (corresponds approximately to the strain point S.P. in accordance with DIN 52312 Part 7, ASTM 598 and ISO 7884-7) should then be above 610° C., and the temperature for viscosity $10^{13}$ dPas (corresponds approximately to the annealing point A.P. in accordance with DIN 52312 Part 7) should be above 650° C.

Although viscosities of the glasses in the upper temperature range have no importance for said application in display technology, they should, however, be matched to the production process selected. For example, the temperature for viscosity $10^{7.6}$ dPas (corresponds approximately to the softening point in accordance with DIN 52312 Part 6) should be between 820 and 920° C. and the temperature for viscosity $10^4$ dPas (corresponds to the working point W.P. in accordance with DIN 52312 Part 2) should be between 1120 and 1270° C.

The density of the glasses should not be excessive, in particular for use as substrate glass for display devices, since otherwise the image reproduction units are too heavy. This is particularly disadvantageous in large-format displays, which can be hung on a wall like a picture. The density of the glass should thus be as low as possible, at least below 2.800 g/cm$^3$.

In order to ensure good mechanical stability of the display, the modulus of elasticity (E-modulus) should be as high as possible, at least above 70 GPa.

High requirements are also made of the chemical resistance of display glasses, since various washing operations using various cleaning fluids can be integrated into the production process. Low material removal values allow the use of more aggressive cleaning fluids and thus faster throughput in production.

In addition, it is extremely important, and not satisfactorily ensured hitherto in the prior art, that the glasses are stable to the influence of electromagnetic radiation in the VIS and UV region (250–800 nm), i.e. that they exhibit essentially no drop in transmission in the visible wavelength range after irradiation. This is the only way in which the image brightness remains substantially unchanged over the life of the display.

Numerous glasses for plasma displays have already been described in the patent literature. However, these glasses have a wide variety of disadvantages and/or do not satisfy all the above high requirements:

For example, PCT application WO 96/9259 describes alkali metal-free glasses for plasma displays. Since alkali metal ions have very high ion mobility and, by migrating under the influence of concentration gradients and electric fields, can penetrate into the accompanying materials (phosphors, solder glass) and in the worst case can change them, the presence of alkali metal oxides would in fact be desirable for said use under this aspect.

However, in order to achieve the requisite high thermal expansion without alkali metal oxides, large amounts of the alkaline earth metal oxides BaO (25.5–39% by weight) and SrO (10.5–21.5% by weight) are introduced into the glass, which results in undesirably heavy glasses ($\rho \approx 3.5$ g/cm$^3$). Alkali metal ion diffusion can instead be countered, if necessary, by applying a diffusion barrier to the substrate, for example by coating the glass sheets with silicon dioxide or titanium dioxide. These coatings additionally have the advantage of, as dielectric, effectively limiting the electric current flowing during gas discharge, thereby offering protection against dielectric breakdown.

The comments made above regarding WO 96/9259 also apply to the alkali metal-free glasses of EP 0 729 922 A1 (14–31.5% by weight of BaO, 8–21.5% by weight of SrO).

German Patent Specification DE 43 09 701 C1 and German Offenlegungsschrift DE 43 03 474 A1 describe lead-free or lead- and barium-free crystal glasses for the production of glasses and household articles, where the glass system in question is built up from an alkali-lime silicate glass containing $TiO_2$ and/or $ZrO_2$ and/or $Nb_2O_5$. The glasses have a low or zero content of $Al_2O_3$. The chemical resistance of these glasses does not meet the high requirements of display glasses.

JP 7-101748 A describes low-aluminum, alkali metal-containing glasses for plasma display panels. However, owing to the concentrations of the individual alkali metal oxides (0.3–2.5% by weight of $Li_2O$; 7–12% by weight of $Na_2O$; 1.5–4.5% by weight of $K_2O$) used, these glasses do not have the desired high temperatures in the viscosity range from $10^{14.7}$ to $10^{13}$ dPas.

JP 8-133778 A also describes alkali metal-containing plasma display glasses which, owing to their composition (they contain no $ZrO_2$), do not have the desired temperatures in the range from $10^{14.7}$ to $10^{13}$ dPas. Their solarization stability is also probably inadequate.

Both JP-A 3-40933 and U.S. Pat. No. 5,599,754 name glasses which can be used as substrate glasses for plasma display panels, in which $TiO_2$ is merely an optional constituent. According to the US specification, $TiO_2$ can be used to improve the chemical resistance. These two specifications likewise do not go into the importance of solarization stability and this property is not described. However, it cannot be adequate for all the glasses claimed. The glasses in these two specifications have high contents of alkaline earth metal oxides ($\Sigma$RO 17–25% by weight and 17–27% by weight respectively) and contain CaO as an essential constituent (up to 12% by weight in the case of the Japanese specification). However, this component can, in particular at relatively high contents, have an adverse effect on the devitrification stability of the glasses.

JP 8-290938 A and JP 8-290939 A also describe glasses having a high alkaline earth metal content ($\Sigma$RO 17–27% by weight) which can be used as substrate material for plasma display panels. The glasses in the two specifications differ from one another through a different CaO content (0–2.9% by weight compared with 3–12% by weight) and varying $Al_2O_3$ contents (2–15% by weight and 0.5–4.9% by weight).

PCT application WO 96/11887 describes glasses having a very broad glass composition range, but containing no $TiO_2$. The requisite restriction in the $K_2O$ content to $\leq 9\%$ by weight does not allow the desired high temperatures for the viscosity range from $10^{14.7}$ to $10^{13}$ dPas, i.e. the desired high S.P. and A.P., to be achieved at the same time as high thermal expansion and good acid resistance.

The object of the invention is to find a transparent and solarization-stable glass having a high transition temperature $T_g$, low density $\rho$ and good chemical resistance which is suitable for use as substrate glass in display technology, in particular for plasma display panels. The glass should preferably be capable of conversion into sheets in a float unit.

The glass contains from 45 to 68% by weight of $SiO_2$. At higher contents, a thermal expansion $\alpha_{20/300}$ of at least 8.1 $10^{-6}$/K cannot be achieved, and the working point W.P. adopts very high values. At lower contents, the chemical resistance, in particular the acid resistance, becomes poor. Preference is given to an $SiO_2$ content of from 48 to 58% by weight.

The $Al_2O_3$ content is between >5 and 18% by weight. Here too, the W.P. increases strongly at higher contents, while $\alpha_{20/300}$ adopts values which are too low. At lower $Al_2O_3$ contents, the desired high viscosity values in the lower temperature range are not achieved, and the density is not sufficiently low. Particular preference is given to an $Al_2)_3$ content of between 9 and 15% by weight.

As flux for simplifying melting and for matching the thermal expansion, the glass contains from 10 to 20% by weight of the alkali metal oxides $Na_2O$ and $K_2O$, more precisely from >9 to 15% by weight of $K_2O$ and 0–5% by weight of $Na_2O$. $LiO_2$ and $Cs_2O$ can be omitted, which is advantageous owing to their relatively high raw material costs and to their adverse effect on crystallization stability.

$K_2O$ is in said excess with respect to $Na_2O$ or is the only alkali metal oxide present in order to facilitate the desired high viscosity values in the lower temperature region and low density of the glass. The $Na_2O/K_2O$ weight ratio should preferably be between 0 and 0.4. In a particularly preferred embodiment of the invention, the $Na_2O$ content is from 1 to 4% by weight and the $K_2O$ content is from 9.5 to 14% by weight, with the total of $Na_2O$ and $K_2O$ being between 11 and 16% by weight. The particularly preferred $Na_2O/K_2O$ weight ratio is between 0.15 and 0.35, because in glass melts in which the alkali metal oxide is exclusively $K_2O$ or $K_2O$ in a large excess with respect to $Na_2O$, increased dissolution of the refractory materials can occur in unfavourable cases. In addition, potassium-rich glasses have a lower modulus of elasticity than sodium-rich glasses.

$B_2O_3$ can be omitted completely.

An essential glass constituent is the alkaline earth metal oxides. In order to raise the transition temperature and the annealing point to the highest possible values while maintaining high expansion, the sum of CaO, SrO and BaO should be between 8 and <17% by weight.

Said alkaline earth metal oxides are in part interchangeable. For example, CaO and BaO can be present in amounts of from 0 to 10% by weight, while SrO is a permanent constituent of the glasses in an amount of from 0.5 to <17% by weight, since this component has advantages over CaO with respect to the devitrification stability of the glasses and over BaO has the advantage of lower density of the glasses. MgO should be present at most in traces or not at all, since MgO-containing glasses have lower chemical resistance, lower devitrification stability and lower annealing and strain points than comparable CaO-containing glasses. In addition, MgO, again compared with CaO, increases the thermal expansion less, so that in order to achieve the same effect, i.e. high thermal expansion, about twice the amount of MgO, with its disadvantages, would also be necessary.

In a preferred embodiment of the invention, the CaO content of the glasses is between 2 and 10% by weight at an SrO content of from 0.5 to 14% by weight and a BaO content of 0–10% by weight; the sum of the three alkaline earth metal oxides should be between 8 and <17% by weight.

These glasses having high CaO contents advantageously have very high acid resistance, low density and a high modulus of elasticity; however, they can under certain circumstances be rather susceptible to devitrification. Therefore, another preferred embodiment of the invention provides limiting the CaO content to 0–<3% by weight at an SrO content of from 9.5 to <17% by weight and a BaO content of 0–<7.5% by weight, where the sum of the three alkaline earth metal oxides should be between 12 and <17% by weight.

In a particularly preferred embodiment of the invention, CaO is omitted entirely. The SrO content should then be between 9.5 and 15% by weight, and the BaO content should be between 0 and <7.5% by weight. The sum of SrO and BaO is <17% by weight. These high SrO-content glasses are very stable to devitrification and in addition have low densities and good acid resistance.

Furthermore, the novel glasses contain $ZrO_2$; at a content in the range from 1 to 6% by weight, $ZrO_2$ increases the transition temperature $T_g$ and improves the lye resistance. At higher contents, however, the hydrolytic resistance would be impaired and the thermal expansion too low. Furthermore, the poor meltability of $ZrO_2$ raw materials could result in glass flaws. Preference is given to a $ZrO_2$ content of 2–5% by weight.

A constituent of particular importance is $TiO_2$. It improves, in particular, the hydrolytic resistance, but the resistance to acid, lye and buffered hydrofluoric acid solution is also positively effected. Compared with the other network formers $SiO_2$, $Al_2O_3$ and $ZrO_2$, it results in higher thermal expansion, a higher modulus of elasticity, a lower working point and a lower devitrification tendency. Of particular significance, however, is the drastic improvement in solarization stability caused by $TiO_2$. This gives glasses which guarantee substantially unchanged image brightness when used as substrate glasses for display devices. In order to achieve an adequate action, the $TiO_2$ content should be at least 0.2% by weight. A limiting factor for the maximum $TiO_2$ content is an undesired brown coloration at high $TiO_2$ contents, which is caused by the formation of a coloured Ti/Fe complex. This coloration can be suppressed by using low-iron raw materials and by avoiding iron contamination in the melting process, for example by not reusing domestic cullet, which additionally contains iron after comminution in a cullet crusher. A $TiO_2$ content of up to 5% by weight is possible, but is preferably limited to 3% by weight, in particular for mass products, owing to cost reasons. Particular preference is given to a content in the range between 0.5 and 2% by weight.

In addition to the glass constituents mentioned above, one or more components from the group consisting of $La_2O_3$, $Ta_2O_5$, $Nb_2O_5$ and $Y_2O_2$ can also be present in the glass. They can each be present in an amount of up to 5% by weight, but the total should also not exceed 5% by weight. These components can cause a reduction in thermal expansion and an improvement in crystallization stability and chemical resistance. Owing to their high raw material costs, however, their use is usually avoided, since said properties can also achieve the high quality required using less expensive constituents.

In order to improve the glass quality, one or more refining agents known per se can be added to the batch in conventional amounts in order to refine the glass.

If $As_2O_3$ and $Sb_2O_3$ are avoided, which is possible without impairing the glass quality, the glasses can, after the actual melting operation, be converted into sheets in a float unit, since they have no readily reducible constituents, in particular no PbO besides $As_2O_3$ and $Sb_2O_3$.

The good glass quality, in particular the good surface quality, is also achieved by the glasses being free from $B_2O_3$ and ZnO.

In a further preferred embodiment, the good glass quality is achieved by adding from 0.1 to 2% by weight of alkali metal halides (preferably NaCl or KCl) as refining agents. The amounts remaining in the glass after refining are much lower owing to the mode of action of these refining agents.

The novel glass has the following advantageous properties: it has a thermal expansion $\alpha_{200/300}$ of between 8.1 and 9.0 $10^{-6}$/K (matched to the conventional phosphors)

a transition temperature of >650° C. (improved dimensional stability after heat treatment)

relatively low density ($\rho$<2.800 g/cm$^3$)

good devitrification stability good chemical resistance, in particular good acid resistance very good solarization stability and, in a preferred embodiment, can be converted into sheets in a float unit.

The novel solarization-stable glass is thus highly suitable for use as substrate glass in display technology, in particular for the production of plasma display panels. Its potential uses are naturally not restricted to this area. For example, it is likewise highly suitable, owing to its particular properties, for use as substrate glass for solar collectors.

EXAMPLES

Glasses were produced from conventional raw materials and with addition of 0.3% by weight of NaCl or KCl as refining agent in inductively heated platinum crucibles at 1550° C., the melt was refined at this temperature for one and a half hours and then stirred for 30 minutes for homogenization. The temperature was increased to 1580° C. for 30 minutes, then reduced to 1550° C. and again held at this temperature for 30 minutes. Of the chloride employed, about 0.02% by weight remain in the glass, which is not shown in the table below.

The tables show in Examples 1 to 5 novel glasses with their compositions (Table 1) and their most important properties (Table 2). Example 6 is a $TiO_2$-free comparative example. It illustrates the importance of the $TiO_2$ content, in particular for the solarization stability, one of the properties essential to the invention.

The solarization stability is indicated as follows: glass plates having a thickness of 1 mm were irradiated for 15 hours using a Philips HOK-4 UV mercury vapor discharge lamp with a power consumption of 400 W at a distance of 7 cm. The difference in the transmission values before and after irradiation at a wavelength of about 350 nm is the most pronounced. This drop in transmission at 350 nm is referred to as solarization. It should be as low as possible and at most 5%.

The various chemical resistances are indicated as follows: glass plates measuring 70 mm×50 mm×2 mm which have been polished on all sides are treated with the particular solution for the stated time at the stated temperature, and the weight loss is determined and indicated in mg/cm$^2$.

$H_2O$: Treatment with water for 24 hours at 95° C. The weight loss should if possible not exceed 0.1 mg/cm$^2$.

HCl: Treatment with 5% hydrochloric acid for 24 hours at 95° C. The weight loss should if possible not exceed 0.5 mg/cm$^2$.

NaOH: Treatment with 5% sodium hydroxide solution for 6 hours at 95° C. The weight loss should if possible not exceed 1.0 mg/cm$^2$.

$NH_4F \cdot HF$: Treatment with 10% buffered hydrofluoric acid solution for 20 minutes at room temperature. The weight loss here should if possible not exceed 7 mg/cm$^2$.

The parameters for the crystallization tendency (devitrification tendency) or stability are the liquidus temperature LT, the maximum crystal growth rate vmax and the temperature at $V_{max}$, the temperature of maximum crystal growth $Kg_{max}$.

The temperatures for viscosities $10^{14.7}$ dpas, $10^{13}$ dpas, $10^{7.6}$ dPas, $10^4$ dpas and $10^2$ dPas are referred to in the table as L14.7, L13, L7.6, L4 and L2 respectively.

TABLE 1

Composition (in % by weight, based on oxide) of the glasses

|  | 1 | 2 | 3 | 4 | 5 | 6 |
|---|---|---|---|---|---|---|
| $SiO_2$ | 63.85 | 57.8 | 55.0 | 54.0 | 50.8 | 54.8 |
| $Al_2O_3$ | 5.35 | 12.0 | 10.85 | 11.0 | 13.0 | 11.0 |
| $Na_2O$ | 3.0 | 3.0 | 3.15 | 3.0 | 3.0 | 3.0 |
| $K_2O$ | 12.7 | 13.0 | 11.0 | 10.85 | 11.0 | 10.85 |
| CaO | 9.0 | 4.0 | 2.45 | — | — | — |
| SrO | 0.6 | 4.8 | 12.25 | 11.2 | 10.4 | 11.2 |
| BaO | — | — | — | 4.65 | 4.5 | 4.65 |
| $ZrO_2$ | 5.0 | 4.4 | 4.55 | 4.5 | 4.5 | 4.5 |
| $TiO_2$ | 0.5 | 1.0 | 0.75 | 0.8 | 0.8 | — |

TABLE 2

Selected properties of the glasses (composition, see Table 1)

|  | 1 | 2 | 3 | 4 | 5 | 6 |
|---|---|---|---|---|---|---|
| $\alpha_{20/300}$ [$10^{-6}$/K] | 8.33 | 8.39 | 8.55 | 8.50 | 8.66 | 8.47 |
| $T_g$ [° C.] | 651 | 667 | 661 | 655 | 660 | 652 |
| $\rho$ [$10^3 \cdot kg/m^3$] | 2.564 | 2.592 | 2.698 | 2.754 | 2.779 | 2.744 |
| L14.7 [° C.] | 621 | 620 | 636 | 628 | 637 | 626 |
| L13 [° C.] | 658 | 680 | 675 | 670 | 679 | 669 |
| L7.6 [° C.] | 862 | 886 | 884 | 898 | 901 | 900 |
| L4 [° C.] | 1191 | 1238 | 1218 | 1245 | 1245 | 1253 |
| L2 [° C.] | 1609 | 1676 | 1637 | 1659 | 1660 | 1699 |
| $Kg_{max}$ [° C.] | 1050 | n.m. | 1150 | 1100 | 1150 | 1100 |
| $v_{max}$ [μm/h] | 163.0 | n.m. | 42.8 | 19.7 | 178.9 | 25.9 |
| LT [° C.] | 1200 | n.m. | 1200 | 1200 | 1220 | 1250 |
| Modulus of elasticity [GPa] | 74 | 71 | 73 | 76 | 72 | 73 |
| Solarization [%] | 3.0 | 1.5 | 2.5 | 1.5 | 2.5 | 6.0 |
| $H_2O$ [mg/cm$^2$] | 0.03 | 0.02 | 0.02 | 0.01 | 0.02 | 0.03 |
| HCl [mg/cm$^2$] | 0.01 | 0.06 | 0.07 | 0.07 | 0.32 | 0.06 |
| NaOH [mg/cm$^2$] | 0.30 | 0.43 | 0.43 | 0.42 | 0.49 | 0.42 |
| $NH_4F \cdot HF$ [mg/cm$^2$] | 2.7 | 2.9 | 4.4 | 3.7 | 5.2 | 3.8 | n.m. = not measured

What is claimed is:

1. Solarization-stable aluminosilicate glass having the following composition, in % by weight, based on oxide:

| $SiO_2$ | 45 | — | 68 |
|---|---|---|---|
| $Al_2O_3$ | 9 | — | 18 |
| $Na_2O$ | 0 | — | 5 |
| $K_2O$ | >9 | — | 15 |
| where $Na_2O + K_2O$ | ≧10 | | |
| CaO | 0 | — | 9 |
| SrO | 4.8 | — | <17 |
| BaO | 0 | — | 10 |
| where CaO + SrO + BaO | 8 | — | <17 |
| $ZrO_2$ | 1 | — | 6 |
| $TiO_2$ | 0.2 | — | 5 | and, optionally refining agents in conventional amounts, provided that, apart from unavoidable contaminants in no more than trace amounts, it is free from MgO.

2. Aluminosilicate glass according to claim 1, wherein the $Na_2O/K_2O$ weight ratio is at most 0.4.

3. Aluminosilicate glass according to claim 1, having the following composition in % by weight, based on oxide:

| $SiO_2$ | 45–68 |
|---|---|
| $Al_2O_3$ | 9–18 |
| $Na_2O$ | 0–5 |
| $K_2O$ | >9–15 |
| where $Na_2O + Ka_2O$ | ≧10 |
| CaO | 2–9 |
| SrO | 4.8–14 |
| BaO | 0–10 |
| where CaO + SrO + BaO | 8–<17 |
| $ZrO_2$ | 1–6 |
| $TiO_2$ | 0.2–3 | and, optionally refining agents in conventional amounts.

4. Aluminosilicate glass according to claim 1, having the following composition in % by weight, based on oxide:

| $SiO_2$ | 45–68 |
|---|---|
| $Al_2O_3$ | 9–18 |
| $Na_2O$ | 0–5 |
| $K_2O$ | >9–15 |
| where $Na_2O + Ka_2O$ | ≧10 |
| CaO | 0–<3 |
| SrO | 9.5–<17 |
| BaO | 0–<7.5 |
| where CaO + SrO + BaO | 12–<17 |
| $ZrO_2$ | 1–6 |
| $TiO_2$ | 0.2–3 | and, optionally refining agents in conventional amounts.

5. Aluminosilicate glass according to claim 1, having the following composition in % by weight, based on oxide:

| $SiO_2$ | 48–58 |
|---|---|
| $Al_2O_3$ | 9–15 |
| $Na_2O$ | 1–4 |
| $K_2O$ | 9.5–14 |
| where $Na_2O + Ka_2O$ | 11–16 |
| SrO | 9.5–15 |
| BaO | 0–<7.5 |
| where SrO + BaO | <17 |
| $ZrO_2$ | 2–5 |
| $TiO_2$ | 0.5–2 | and, optionally refining agents in conventional amounts.

6. Aluminosilicate glass according to claim 1 wherein the $Na_2O/K_2O$ weight ratio is between 0.15 and 0.35.

7. Aluminosilicate glass according to claim 1, which has been processed in a float unit, and which is, apart from unavoidable contaminants, free from PbO, $As_2O_3$, $Sb_2O_3$, ZnO, MgO and $B_2O_3$.

8. Aluminosilicate glass according to claim 1, which additionally contains up to a total of 5% by weight of one or more components selected from the group consisting of $La_2O_3$, $Ta_2O_5$, $Nb_2O_5$ and $Y_2O_3$.

9. Aluminosilicate glass according to claim 1 which has a glass transition temperature $T_g$ of above 650° C., a density $\rho$ of less than 2.800 g/cm$^3$ and a coefficient of thermal expansion $\alpha_{20/300}$ of between 8.1 and 9.0×10$^{-6}$/K.

10. A substrate for a flat display panel wherein the substrate comprises an aluminosilicate glass according to claim 1.

11. A plasma display panel comprising a flat transparent glass substrate which is comprised of an aluminosilicate glass according to claim 1.

12. A solar collector comprising a transparent glass substrate which is comprised of an aluminosilicate glass according to claim 1.

* * * * *